United States Patent [19]
Dianitsch et al.

[11] Patent Number: 4,523,819
[45] Date of Patent: Jun. 18, 1985

[54] EYEGLASSES WITH EXCHANGEABLE LENSES

[75] Inventors: Franz Dianitsch, Linz; Anton Pschebezin, Haid, both of Austria

[73] Assignee: Optyl Eyewear Fashion International Corporation, Norwood, N.J.

[21] Appl. No.: 497,645

[22] Filed: May 24, 1983

[51] Int. Cl.³ .................. G02C 1/00; G02C 1/04; G02C 5/00
[52] U.S. Cl. .................. 351/106; 351/86; 351/154
[58] Field of Search .............. 351/44, 47, 52, 86, 351/106, 107, 142, 154, 103

[56] References Cited
U.S. PATENT DOCUMENTS
4,176,921 12/1979 Matthias .................. 351/47
4,371,238 2/1983 Lhospice .................. 351/106

FOREIGN PATENT DOCUMENTS
291258 9/1953 Switzerland .................. 351/106

Primary Examiner—Rodney B. Bovernick
Attorney, Agent, or Firm—Fitch, Even, Tabin & Flannery

[57] ABSTRACT

Eyeglasses have lenses resting in partial rims and these are held tight by means of a thread which travels in grooves on the lens edges. Adjustment and tightening of the tension of the thread to hold the lens on the eyeglasses is accomplished by a tensioning device carried on the eyeglasses. The tension of the thread is lessened to allow lens replacement or is increased to hold the lens in position with operation of the tensioning device.

7 Claims, 11 Drawing Figures

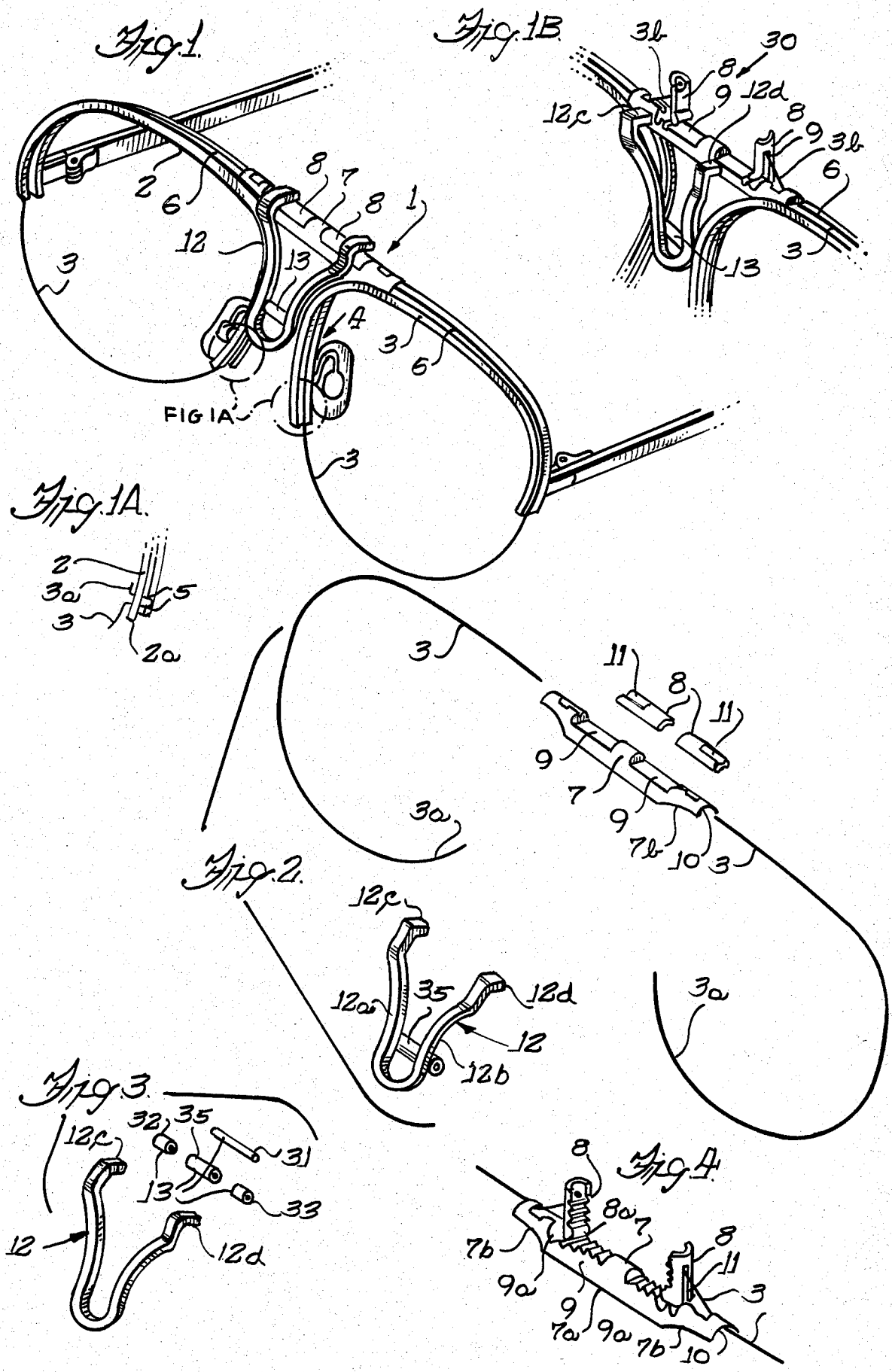

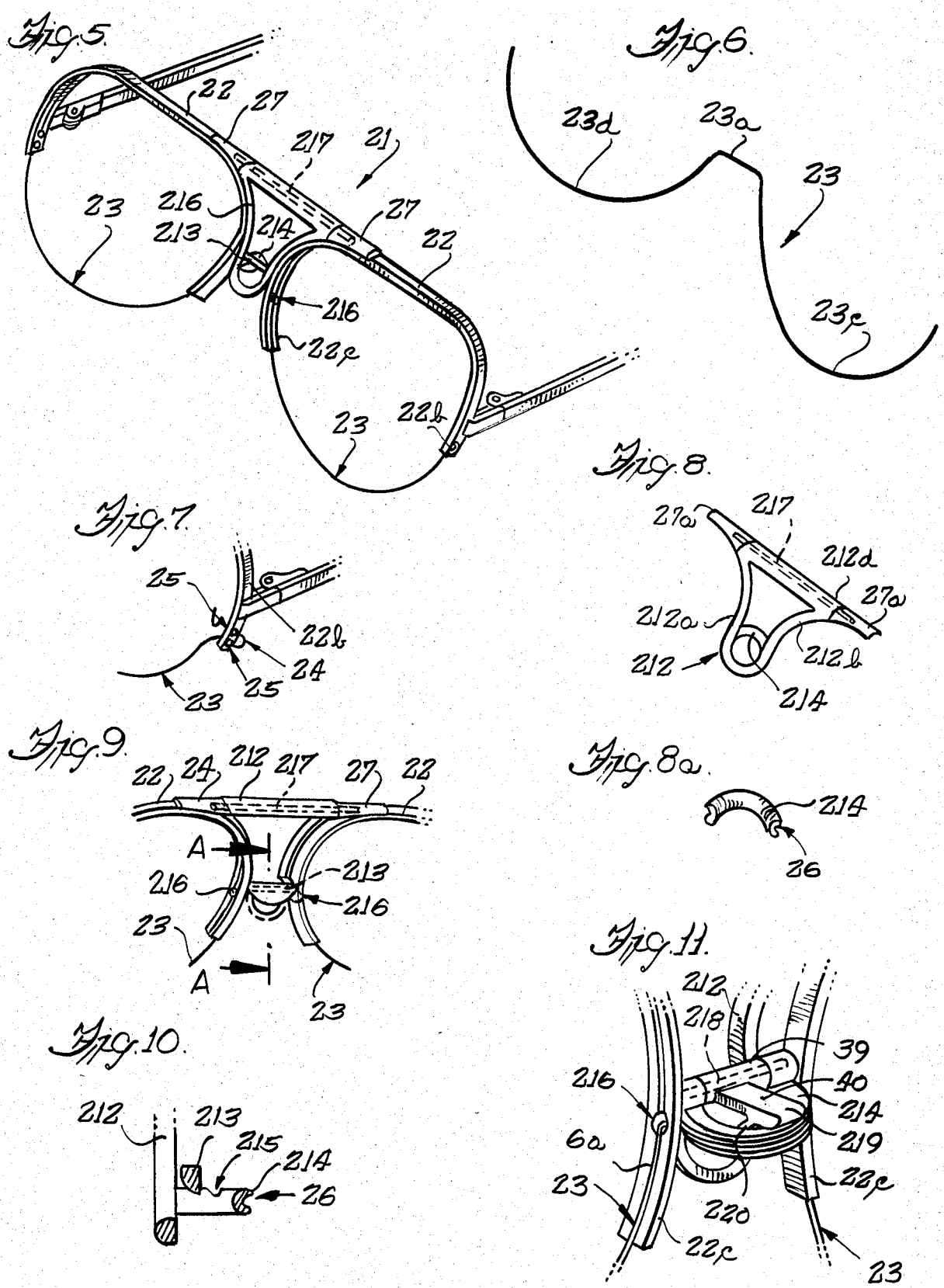

EYEGLASSES WITH EXCHANGEABLE LENSES

This invention relates to eyeglasses and more particularly to sun and/or corrective eyeglasses or athletic glasses, the lenses of which are exchangeable with others of different color and/or different optics.

Exchangeable lenses are used in eyeglasses with complete rims, i.e. rims completely surrounding the lens, having thereon hook-shaped support pins which are bent inward to connect the lens to the rims. The lenses are inserted from above into position to be supported by these pins on the rim. A hinged lever, which is attached to the upper bridge of the eyeglass frame, carries one additional support pin for each lens and performs the task, when the lever is folded down, of preventing the lenses from sliding upward from the rims.

With the more widespread use of eyeglasses in recent times which have partial rims (i.e. rims which extend over only a part of the edge of the lens), there is insufficient rim material to support pins at the lower locations as is possible with the full complete rims. Heretofore, it has been proposed to fasten the end of an elastic thread on each end of a partial rim and to provide a thread receiving groove in the exposed edge of the lens which is not surrounded by the partial rim. The length of the elastic thread is dimensioned such that it is taut after its insertion into the lens groove to hold lens in place on the partial frames.

However, in practice, significant problems arise because the thread length must be held within very small tolerances. In the case of too short a thread, the lens becomes too tightly clamped in the groove, which not only makes it more difficult to exchange lenses, but also gives rise to the possibility of damaging the lens or the groove of the lens. If, on the other hand, the thread is too long, then the lens is not seated sufficiently tightly in the rim, and it falls out easily. With a greater elasticity of the thread, the length of the thread becomes less critical but then the inserted lens can easily be pushed out of the rim if the glasses are subjected to even a small amount of mechanical stress, as is the case, for example, when the glasses are stuck between items of clothing in a fully packed suitcase.

The present invention is directed to the eyeglasses with exchangeable lenses which rest in partial rims and to overcoming the above-noted shortcomings of prior art eyeglasses and to permitting a fast and easy exchange of the lenses, as well as assuring that they are held firmly and securely in the rims. More specifically, the present invention is directed to eyeglasses with exchangeable lenses which rest in partial rims with the edges of the lenses in those regions not surrounded by the partial rims being surrounded by tensioned threads which rest in grooves. In accordance with the present invention, the threads are fastened to one end of their associated partial rim and meet in the bridge region of the eyeglass frame with the thread being selectively tensioned by a tensioning means on the eyeglass frame.

While prior art eyeglasses experienced a tightening of the thread when it was inserted into the edge groove of the lens, the strength of the tension in thread was not adjustable. The present invention allows the lenses to be inserted when the thread is free of tension and permits tensioning of the thread and also allows adjustment of the amount of tension on the thread.

In this manner, it is not only possible to effortlessly exchange the lenses, but one can also compensate for incorrect dimensioning of the thread length within certain limits.

A general object of the present invention is to provide a new and improved eyeglasses with exchangeable lens held in place by a tensioned thread connected to partial rims.

These and other objects and advantages of the invention will become clear from the following detailed description taken in conjunction with the accompanying drawings in which:

FIG. 1 shows a pair of eyeglasses with the features of the invention in a perspective depiction;

FIG. 1A is a detailed view taken from FIG. 1 of thread loop connection to a partial rim;

FIG. 1B is a view similar to FIG. 1 of the bridge and tensioning means with the latter in its open non-tensioning position;

FIG. 2 is an exploded view showing certain individual parts of the tensioning means of FIG. 1 in disassembled form;

FIG. 3 is an exploded view of the retaining clip and its pivot mounting used in the eyeglasses of FIG. 1;

FIG. 4 is an enlarged view illustrating the thread stays of the tensioning device of FIG. 1;

FIG. 5 shows a pair of eyeglasses with a modified embodiment form of a tensioning device;

FIG. 6 shows the configuration of the gripping thread when tensioned in the embodiment of FIG. 5;

FIG. 7 illustrates the nature of fastening of the thread to a partial rim;

FIG. 8 shows a clamp and a stop lever, as these are used in the embodiment according to FIG. 5;

FIG. 9 shows the path of the gripping thread in the bridge region of the eyeglass frame in the embodiment form of FIG. 5;

FIG. 10 is a sectional view taken along the section line A—A of FIG. 9; and

FIG. 11 shows another embodiment of the rotatable locking clamp and stop hook which prevents unintentional opening of the clamp.

As shown in the drawings for purposes of illustration, the invention is embodied in an eyeglass having an eyeglass frame 1 with partial rims 2 for the lenses (not depicted). At inner ends 2a (FIG. 1A) of the partial rims 2 and located at the bridge means or bridge region 4, each inner end 3a of a thread 3 is fastened to an associated partial rim. In the embodiment example shown, the fastening takes place by means of insertion and pulling of a thread loop 4 through two holes 5 (FIG. 1A) which have been bored next to one another in the end 2a of a partial rim 2. The thread is held fast after tightening by being looped and turned through the holes to provide a self-fastening of the thread end 3a to the rim end 2a. The thread can however also be fastened in other ways, for example by inserting the end of the thread into a slit provided at the end 2a of a partial rim then squeezing the slit together by means of a screw which is inserted into the partial rim to clamp the thread end to the rim. Other types of fastenings of the thread to a rim may be used and fall within the purview of the present invention.

The thread has a certain elasticity and preferably consists of monofilament of stretched nylon. However, it is to be understood that threads of a different structure and of other materials can be used. The term "thread" is intended to embrace thin filaments, strands, wires or other equivalent structures whether they are monofilaments or multi-filaments. The thread 3 may be formed of plural separate thread sections, such as thread sections shown in FIG. 2 or it may be a single continuous thread 23 (FIG. 6) which is described hereinafter in connection with FIGS. 5–10.

Each of the thread sections passes, beginning from the inner end of a partial rim, downward in a groove in the lens (not shown) to the outer end 2b of the partial rim, and from there, upwardly in a groove 6 which faces outwardly and is located in the peripheral surface of the partial rim.

In accordance with the present invention, the thread 3 or 23 is shifted to a taut or tight position, in which the thread is tensioned to securely hold the lenses in position, from a loose or non-taut position by a gripping or tensioning means 30. This is achieved by having a portion of thread displaced at the central bridge means to pull more tightly the thread portions extending within the grooves in the partial rims and within the grooves in the lenses. As will be explained, the tensioning means 30 shown in FIG. 1B, has thread ends 3b fastened to pivotally mounted thread stays 8, which when swung from their open upstanding positions of FIG. 1B and FIG. 4 will pull the respective thread ends 3B toward the center of the glass frame means thereby tensioning the thread as the stays 8 are moving down to a horizontal position, as in FIG. 1.

In the embodiment of FIGS. 5–10, the central section 23a of the thread 23 that spans the partial rims is pushed rearwardly to pull tight the thread sections in the lens grooves and the partial rims, as will be described in more detail hereinafter, in connection with FIGS. 5–10.

Referring now in greater detail to the first embodiment of the invention, which is shown in FIG. 2 in disassembled form, to permit better illustration of its individual parts. A base element or crosspiece 7a of the bridge means 7 is secured at curved sections 7b to the two partial rims and constitutes a rigid stationary upper frame portion for the eyeglasses. The ends of crosspiece 7a are each formed with a tunnel 10 through which the thread ends 3b run after they leave grooves 6. On the upper side of the cross piece is a surface 9, which serves as support surface for a thread stay 8. To each thread stay 8, an end 3b of the thread 3 is fastened, after the end of the thread has passed through a thread trench 11 in the stay 8 (FIGS. 2 and 4) and through a hole in the stay at which the thread end 3b may be fastened in a number of conventional manners.

In horizontal position, the thread stay 8 rests on the support surface 9 and is locked in this position by means of a retaining clip 12 (FIG. 1), which is pivotally mounted on a crosspiece means 13, which extends between and is fastened at its ends to the partial rims 2 below the bridge 7. More specifically, as seen in FIG. 3, the crosspiece means 13 includes a pin 31 which is inserted into end pieces 32 and 33 and retained thereby with end pieces 32 and 33 being fastened securely to the left and right partial frames 2. The pivot pin 31 inserted through the hollow interior of a cylindrical tube 35 which is secured to opposite legs 12a and 12b at the lower U-shaped end of the clip 12.

When it is desired to change the lenses in the partial rims 2 of the eyeglass frame 1, the retaining clip 12 is swung from its locking position over the stays as shown in FIG. 1 to its open position removed from the stays as shown in FIG. 2, whereby the thread stays 8 may be pivoted upwardly to an unlocked position. With the stays 8 up (FIG. 4) in the unlocked position, the thread sections 3 are loosen to such an extent, that the lenses can be inserted into the partial rims 2 and the threads 3 can be layed into the edge grooves of the lenses. After this, the thread stays 8 are pivoted down about enlarged pivot bosses 8a which are positioned in pivot grooves 9a (FIG. 4) on support surfaces 9, whereby the threads are tensioned and hold the lenses in their partial rims. Finally, by means of pivoting of the free, hook-shaped ends 12c and 12d (FIG. 3) of the retaining clip upwardly to snap fit or hook over the horizontally extending threads stays 8, the thread stays 8 are held locked in their horizontal position.

Preferably, the support surface 9 and lower surface of the thread stay 8 are toothed (FIG. 4), to interlock. Also, several pivot grooves 9a are provided in the support surface 9 to receive a pivot end 8a of the stay to allow movement of the thread stays 8 toward or from each other on the support surface 9. Thus, a thread stay can be located at different distances from the midpoint of the bridge 7. In this manner, the thread tension can be adjusted and is made variable and can accommodate the elastic properties and tolerance variations in the thread.

In FIGS. 5 through 11, a further embodiment of the inventive of a pair of eyeglasses is depicted. Here, the thread section 23a at the bridge region is integrally connected to thread sections 23c and 23d and forms a single continuous thread 23 (FIG. 6) for holding both lenses in their respectively associated partial rims 22 of the eyeglass frames 21. At an outer end 22 (FIG. 7) of the first partial rim 22 (the one further away from the bridge region) the one end 24 of the thread is looped through two holes 25 and drawn tight (FIG. 7). Then the thread travels under the first lens (not shown) to a groove 6a (FIG. 11) in the inner end 22c of the partial rim 22 and then through a hole 216 in the partial rim. The thread section 23a then goes across the bridge area or bridge means 27 at which the thread section 23a may be displaced by the tensioning means and then into another hole 216 in the inner end 22c of the other left partial rim 22 as viewed in FIG. 11. The thread travels in the groove 6a down to underside of the other lens and then up to an end 24 fastened to outer end 22b of the left partial rim 22 as viewed in FIG. 5.

The bridge means 27, which in the top part of the eyeglass frame 21, is fastened to and connects the two partial rims 22 with one another carries a pivot pin 217 for pivotally mounting the tensioning means which includes a pivotally mounted clip or clamping means 212. The clamping means 212 includes a hollow, horizontal bore in its upper central section 212d (FIG. 8) through which extends a pivot pin 217. The pivot pin 217 is fastened at its opposite ends to stationary bridge pieces 27a which are in turn securely fastened to the partial rims 2. The illustrated clamping means includes a pair of depending legs 212a and 212b which extend down from the center section 212d at the pin 217 to a crosspiece 213 (FIGS. 5 and 9) in the form of a rod fastened at opposite ends to the right and left hand partial rims 2. As can be seen from FIG. 8, the clamping means 212 at its lower end bears a stop hook 214, which hooks under the crosspiece 213. The stop hook is detented to the crosspiece as it is flex to pass under the crosspiece 213 to bring a notch 215 (FIG. 10) into engagement with the lower end of cross piece 213, as shown in FIG. 10. The stop hook 214 on the clamping means 212 is formed with a groove 26 (FIGS. 8a and 9) and is arranged on the clamp means 212 in such a manner, that in its first state, the groove 24 is aligned to engage the center thread section 23a spanning the partial rims. As the thread section 23a laying in the groove is pushed rearwardly by the stop hook 214, more thread is pulled through the holes 216 in the partial rims into the center section 23 thereby tightening the thread portions disposed under the lenses. When the hook 214 is snapped under the crosspiece 213 and interlocked therewith, the tensioning means now holds the thread taut.

In this FIG. 5 of the embodiment of the invention, the thread tension can be varied by making the stop hook 214 with several detent notches 215 (FIG. 10) each of which can be selectively locked to the crosspiece 213 to provide the different degrees of thread displacement and thereby thread tension.

In FIG. 11, an additional locking arrangement of the stop hook 214 is shown. Here in FIG. 11, the crosspiece 213 includes a pivot pin 218 which extends between the partial rim ends 22c. A locking lever 219 with lug 220 is pivotably mounted to turn about pivot pin 218. The locking lever 219 includes a hollow tubular portion 39 through which extends the pivot pin 218. The locking lever includes a bar 40 secured to tubular section 39 and the bar is adapted to pivot to its horizontal locking position to engage the top of the stop hook 214. A detent lug 220 depends from the bar 40 to abut the inside of the lock lug 214 and to have a detent or snap fit interlock therewith.

This pivotable locking arrangement makes it possible to protect the clamp 212 against unintentional opening.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed:

1. Eyeglasses comprising:
   a frame means;
   a pair of exchangeable lenses carried by the frame means;
   partial rims on the frame means partially surrounding the lenses;
   grooves formed in edges of the lenses;
   a thread projecting into the grooves and cooperating with the partial rims to support and to retain the lenses;
   an upper bridge on said frame means and joining the partial rims;
   a lower bridge means on said frame means disposed beneath the upper bridge and joining the partial rims;
   a retainer clip pivoted on the upper bridge and movable between an upper open position and a lower locked position with the lower-bridge means;
   a thread section of the thread located at the lower bridge means and spanning the partial rims; and
   tension means associated with the retainer clip at the lower bridge means to engage the thread section and to force the thread to pull taut and to remain taut when the retainer clip is in its locked position.

2. Eyeglasses in accordance with claim 1 in which the thread is a single continuous member supporting both lenses.

3. Eyeglasses in accordance with claim 2 in which the thread passes through holes in the partial rims, said tensioning means including a clamp means to grip and tension the portion of the thread spanning the holes in the partial rims.

4. Eyeglasses in accordance with claim 1 in which the thread comprises a monofilament of stretched nylon.

5. Eyeglasses in accordance with claim 1 in which closely adjacent holes are formed in the partial rims and the thread end is threaded therethrough and looped to form a self-fastening end between the thread and the partial rim.

6. Eyeglasses comprising:
   a frame means having a bridge,
   a pair of exchangeable lenses carried by the frame means;
   partial rims on the frame means partially surrounding the lenses;
   grooves formed in edges of the lenses;
   a thread having thread sections each secured at one end to an associated partial rim and projecting into the grooves and extending about its associated partial rim to support and to retain the lenses, bridge means on the frame means extending between the partial rims at upper adjacent portions thereof;
   and thread stays connected to the other ends of the thread sections and pivoted on the bridge means to a position for tensioning the thread to tighten the grip of the thread on the lenses;
   a retaining clip pivotally mounted on the bridge means to swing between a closed position in which the retaining clip locks the thread stays in their tensioning position and an open position in which the thread stays pivot to loosen the thread sections for removal of the lenses.

7. Eye glasses comprising:
   a frame means;
   a pair of exchangeable lenses carried by the frame means;
   partial rims on the frame means partially surrounding the lenses;
   grooves formed in edges of the lenses;
   a thread projecting into the grooves and cooperating with the partial rims to support and to retain the lenses;
   means on the eyeglasses for tensioning the thread to tighten the thread and the thread's grip on the lenses;
   the thread being fastened as one end to the partial rims, bridge means on the eyeglass frames, said means for tensioning the thread comprising a gripping means at the bridge means for gripping the thread and pulling the thread to tension the thread;
   the gripping means comprising a pair of movable thread stays secured on the bridge means and movable with respect to the bridge means to tighten or loosen the thread;
   interlocking surfaces on the thread stays and on the bridge means for interlocking with one another to hold the thread taut; and
   a retaining clip for locking the thread stays, and a crosspiece extending laterally between the partial frames and under the bridge means, said retaining clip being pivotally mounted on said bridge means and engageable with the crosspiece.

* * * * *

UNITED STATES PATENT AND TRADEMARK OFFICE
CERTIFICATE OF CORRECTION

PATENT NO. :   4,523,819

DATED      :   June 18, 1985

INVENTOR(S) :  Dianitsch and Pschebezin

It is certified that error appears in the above-identified patent and that said Letters Patent is hereby corrected as shown below:

On the face of the patent, after [22] Filed: May 24, 1983 insert:

[30]   Foreign Application Priority Data

June 8, 1982   [DE] Fed. Rep. of Germany      32 21644

*Signed and Sealed this*

*Twenty-ninth* Day of *October 1985*

[SEAL]

*Attest:*

DONALD J. QUIGG

*Attesting Officer*

*Commissioner of Patents and Trademarks—Designate*